United States Patent

[11] 3,550,826

| [72] | Inventor | John M. Salmela<br>San Rafael, Calif. |
|---|---|---|
| [21] | Appl. No. | 742,977 |
| [22] | Filed | July 3, 1968 |
| [45] | Patented | Dec. 29, 1970 |
| [73] | Assignee | Chevron Research Company<br>San Francisco, Calif.<br>a corporation of Delaware |

[54] METHOD FOR PREPARING EXTREMELY FINE FIBROUS WEBS
11 Claims, 5 Drawing Figs.

[52] U.S. Cl. ............................................. 225/3;
28/1, 83/660, 83/678; 225/97
[51] Int. Cl. ................................................. B26f 1/20,
B26f 3/02
[50] Field of Search .......................................... 225/3, 93,
97, 103; 83/2, 30, 660, 678; 28/1(Inquired)

[56] References Cited
UNITED STATES PATENTS

| 778,006 | 12/1904 | Brooks | 83/660X |
| 1,685,532 | 9/1928 | Bechman | 83/345X |
| 2,980,982 | 4/1961 | Costa et al. | 225/970X |
| 3,273,771 | 9/1969 | Beaumont | 225/3 |
| 3,302,501 | 2/1967 | Greene | 83/2 |

*Primary Examiner*—James M. Meister
*Attorneys*—A. L. Snow, F. E. Johnston and G. F. Magdeburger ABSTRACT: Process for preparing fibrous web from uniaxially oriented polymer film in which the film is fed under slight tension between the rotating surfaces of a first roller having parallel, longitudinal elevated rows of cutting elements on its circumferential surface and a second roller having parallel longitudinal grooves on its circumferential surface which are complementary to and mesh with the rows of cutting elements. The two rollers rotate in opposite directions substantially synchronously at peripheral speeds about 1.5 to 20 times greater than the film speed. As they rotate the rows of cutting elements are forced through the film and enter the second roller's grooves. Thus, the film is fibrillated and thereafter withdrawn from the rollers.

PATENTED DEC 29 1970

INVENTOR
JOHN M. SALMELA
BY
ATTORNEYS

METHOD FOR PREPARING EXTREMELY FINE FIBROUS WEBS

FIELD OF INVENTION

This invention concerns a process for preparing highly regular fibrous webs from uniaxially-oriented polymer films and the apparatus used therefor.

INVENTION BACKGROUND

Copending application Ser. No. 540,149 describes a basic method for preparing uniform fibrous webs from uniaxially oriented polymer films. In general terms this copending application describes a process wherein the film is passes between a driven roller covered with card clothing having regularly spaced points and a rotating, resilient presser or backing roller. The direction in which the film travels is substantially parallel to the rollers and perpendicular to a plane joining the longitudinal axles of the two rollers. These rollers are rotating such that the portions of their peripheries which are contacting the film are moving in the same direction as the film. The presser roller exerts sufficient pressure on the film to cause the clothing points to puncture and penetrate the film. The driven roller is run such that its peripheral speed is about 1.5 to 20 times the film speed. Thus, the clothing points act as cutting elements and cut through the film to give a uniformly fibrillated material.

Although the above-described process has been used commercially to prepare uniform fibrous products for use in the textile industry, an important operating difficulty has been experienced. This difficulty is that the card clothing has to be replaced frequently because of wear. This, of course, causes considerable loss of operating time. Also, as the card clothing wears the fibrous web becomes less uniform. This increasing irregularity is reflected in the quality of the end textile product. Additionally, it is difficult to prepare fine webs and low denier materials using this process.

INVENTION DESCRIPTION

A novel improvement in the above-described general process has now been discovered which decreases significantly the wear on the cutting elements of the driven roller. At the same time, this unique improvement gives a fibrous web of much higher uniformity than the previously used process. Also, this improved process can be used to make very fine webs and low denier materials therefrom.

The improvement of this invention involves several important changes in the above-described process. In the improved process of this invention the film, while under controlled tension, is fed between the rotating circumferential surfaces of a first roller having parallel longitudinal elevated rows of substantially equidistant cutting elements on its circumferential surface and a second roller having parallel longitudinal grooves in its circumferential surface. The respective circumferential surfaces of the two rollers are parallel closely adjacent to and spaced apart from each other. The rows of cutting elements of the first roller communicate and mesh with the second roller's grooves. In other words, the second roller's grooves are complementary to the rows of cutting elements and mate with said rows. The grooves are slightly wider than the elements' lengths and deeper than the elements' heights. Preferably the film is fed between the two rollers at an angle such that it contacts the second roller first and is supported on the circumferential surface of the second roller. However, it can be fed tangentially between the two rollers. The first and second rollers are driven synchronously at peripheral speeds about 1.5 to 20 times, preferably 2 to 15 times, greater than the film speed. Because of the relative positions of the first and second rollers the rows of cutting elements are forced through the film and enter the grooves. And since the rollers are traveling faster than the film, the elements cut elongated slits through the film. The elements slit the film while they are meshed in the groove; and depending on the angle at which the film is withdrawn from between the two rollers, the elements may continue to slit the film after the elements leave the grooves. By withdrawing the film angularly away from the second roller and around the first roller's circumferential surface the lengths of the slits may be increased.

The general technology for preparing the film used in this process is well known in the art. The polymer is extruded in a conventional extruder to provide a film of desired thickness and width. For convenience, a very wide film may be extruded and then slit and trimmed to the desired width. The film may be oriented by drawing it at elevated temperatures. Draw temperatures will depend on the polymer used. The film may be heated to the desired temperature by passing it through a heating zone or over heated rolls or drums. It may be drawn in a single step or in a plurality of steps. The particular draw ratios used to orient the film will be ultimately at least about 4:1 and may extend to a ratio below that which causes the film to fibrillate spontaneously. The ultimate draw ratio in a given instance will again depend on the polymer used. For instance, draw ratios between 6:1 to 10:1, preferably 7:1 to 9:1, are desirable for normally solid, substantially crystalline polypropylene.

The film thickness should be chosen to correspond to the fineness desired in the fibrous product. The thickness of the oriented film used in the process here described is substantially uniform. Generally, the oriented film thickness will be between about 0.3 and about 3 mils, preferably 0.5 to 2 mils. Lower thicknesses within this range are used to make fine products with good hand. Thicknesses in the upper portion of this range give coarser materials.

The polymers which may be used to prepare these films are orientable, normally solid, crystalline polymers and copolymers. Typical examples of such polymers are high density polyethylene, polypropylene, poly-4-methyl-l-pentene, polyesters, polyamides, e.g., the nylons and the like. Mixtures of such polymers may be used if desired. These polymers may also contain additives such as photostabilizers, antioxidants, heat stabilizers, dye acceptors, pigments, dyes, fillers and the like.

The first roller which is used in this invention may be made conveniently but cutting parallel, longitudinal grooves in the circumferential surface of a metal roller. The grooves are spaced substantially equidistant and are about 50 to 500 mils deep. The formation of these grooves leaves elevated longitudinal rows of splines or cogs about 0.1 to 100 mils wide at the top, preferably 0.1 to 30 mils, around the circumferential surface of the first roller. The grooves are "U" shaped or modified "U" shaped so that the leading face of the cog is perpendicular to the forward motion of the cog, i.e. it has a 90° working angle, and the trailing face is perpendicular or acute to the forward motion which gives the cogs a cross section that can be essentially rectangular, trapezoidal or triangular. The cogs are then threaded at a helix angle of about ½ to 45° to form rows of cutting elements or teeth longitudinally across the cog. The threads will be "full cut" and sharp at their tip. The cutting elements may have various shapes but are preferably triangular with the apex angle usually in the range of 10°—70°, preferably 60°.

In the usual method of threading, several separate threads are started at equidistant points on the end of the first roller. Generally the number of starts will vary with the first roller diameter and will be in the range of 2 and 64. For instance, for a 4-inch diameter first roller 6 to 10 thread starts is normal. In any given instance the preferred number of thread starts will depend on the desired fibrillation pattern and the first roller diameter. The number of cutting elements per unit length of cog is related to the number of thread starts and the helix angle of the thread. For most fibrillations carried out according to this invention the number of cutting elements per inch of cog will be about 10 to 100; usually it will be about 20 to 40.

Since the cogs are threaded helically, successive cutting elements in consecutive cogs are offset laterally from each other. The lateral offset distances between successive cutting elements in consecutive cogs are substantially the same and are usually about 0.5 to 50 mils, preferably 1 to 20 mils. This lateral offset distance approximates the individual fibril width in the web formed by the process of this invention. In other words, an individual fibril is formed by the cutting action of successive elements in consecutive cogs.

The size and shape of the cutting elements in any given instance will depend on the web pattern and size of fibrils desired. In general, the narrower the fibrils desired, the narrower and sharper the cutting elements should be at their tips, i.e. they should tend to be more pyramidal than prismoidal.

Practically any number of cogs or splines greater than 1 may be used in this invention. In any given instance the preferred number of cogs will vary depending on the web pattern desired, the first roller's diameter and peripheral speed and the penetration. "Penetration" may be viewed as that portion of the cutting element height which pierces the film. Generally the number of cogs will be within the range of 4 to 300.

The diameter of the first roller is of sufficient magnitude to give adequate strength for the projected length of the first roller. In other words, the diameter should be such that the roller does not sag or bend either from its own weight and/or the force applied to it during the fibrillation. For rollers of normal lengths diameters in the range of 2 to 12 inches will be sufficient. Larger diameters may be used, but they necessitate larger power requirements.

The first roller should be made from an abrasion resistance material such as heat-treated steel, stellite, tungsten carbide, etc. The cutting elements may be independently treated or coated to improve their abrasion resistance.

The circumferential surface of the second roller as contemplated herein is grooved longitudinally such that when its circumferential surface is positioned parallel and closely adjacent to the circumferential surface of the first roller selected second roller grooves mate with and mesh into selected respective cogs on the first roller. When they mesh the cog and groove surfaces do not touch. Thus, the two rollers do not turn each other but are driven independently and synchronously. As previously indicated, the grooves of the second roller are slightly wider than the length of the elements. Within these bounds the groove width should be kept as small as possible to afford more peripheral surface area on which to support the film as it enters between the rollers.

The grooved second roller is subjected to substantial friction because it contacts the film and moves faster than the film. Therefore, this roller will desirably be made from hard metals having low coefficients of friction such as chrome- or ceramic-coated steel. Nonmetallic materials such as hard plastics, e.g., nylon or teflon, may also be used. The second roller will also normally be about 2 to about 12 inches in diameter.

This invention may be further understood by referring to the drawings in which.

Figure 1:
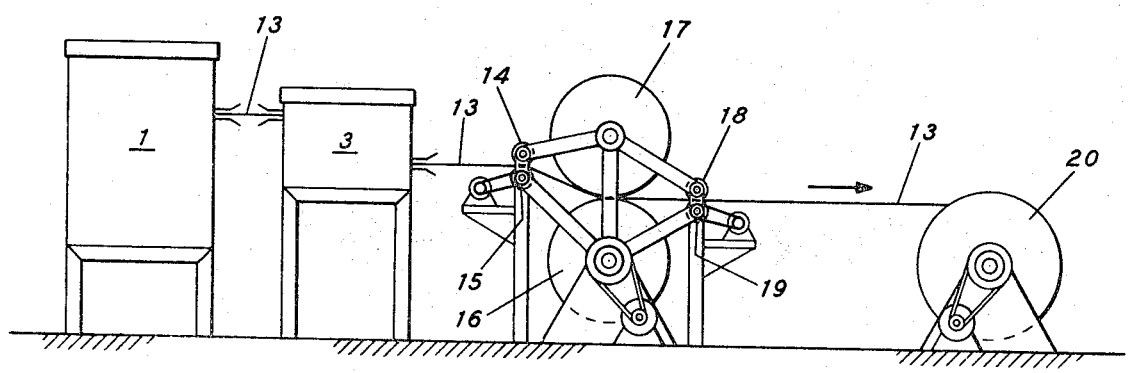
FIG. 1 is a schematic diagram of the film-forming and film-fibrillating apparatus of this invention.

FIG. 1 illustrates extruding means 1 for forming film 13 and orienting means 3 for uniaxially orienting film 13, nip rolls 14 and 15, first roller 16, second roller 17, a motor for driving synchronously first roller 16 and second roller 17 (the belt drive system coupling these two rollers is not shown), pull rolls 18 and 19, a motor for driving these pull rolls, takeup roll 20 and a motor for driving roll 20. Roller 16 is rotating clockwise and roller 17 is rotating counterclockwise.

The controlled tension applied to the film while it is in contact with roller 17 is of a magnitude sufficient to keep it held tightly against the circumferential surface of roller 17. Normally this tension will be about 600 to about 3000 p.s.i. If tension below about 600 p.s.i. are used, the fibrous web may have loose ends and irregularities. Tensions greater than 3000 p.s.i. may be used, but they cause increased second roller wear and require greater power inputs. This tension may be effected by passing the film between nip rolls 14 and 15 of FIG. 1 before it enters between the first and second rollers and between pull rolls 18 and 19 of FIG. 1 downstream of the rollers. The nip rolls ahead of the slitting operation "anchor" the film against the pull of the cutting elements. The tension may be adjusted within the above-mentioned range by increasing the speed of the pull rolls to a value about ¼ percent to about 1 percent greater than the speed of the upstream nip rolls.

Figure 2:
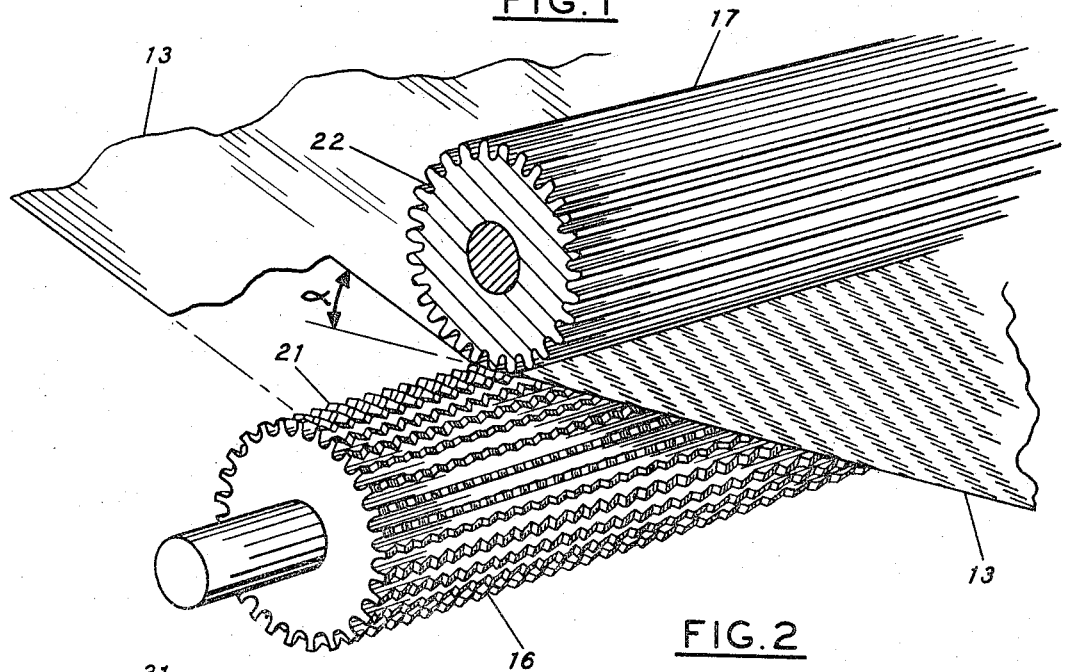
FIG. 2 is an isometric partial view of the meshed fibrillation apparatus of FIG. 1.

FIG. 2 shows an isometric view of film 13 emerging from between first roller 16 and second roller 17. Portions of film 13 and second roller 17 are cut away to show the longitudinal parallel rows of cutting elements 21 extending radially from the circumferential surface of roller 16. Film 13 is being fed between first roller 16 and second roller 17 in the preferred path, i.e., at angle $\alpha$ which causes the film to contact the circumferential surface of roller 17 first. As illustrated, angle $\alpha$ is the angle defined by a tangent drawn at the point where the film initially contacts roller 17 and a chord intersecting the arcs of roller 16 (measured to the tips of the cutting elements) and roller 17. In order that the film contact roller 17 first, this angle in radians is greater than $$2\sqrt{\frac{pD_1}{D_2(D_1+D_2)}}$$

where p is the depth of the greatest penetration of the cutting elements into the grooves of roller 17, $D_1$ is the diameter of roller 16 measured to the tips of the cutting elements and $D_2$ is the diameter of roller 17. This angle will usually be about 3° to 15°. The rows of cutting elements 21 engage film 13 as the film enters between the rollers. As elements 21 puncture film 13 they penetrate radially into mating longitudinal groove 22 of roller 17. They cut substantially equal length slits through the film because of the difference in the speed of roller 16 and the film speed. The film is shown emerging tangentially from between rollers 16 and 17. As indicated previously, the lengths of the slits formed by the cutting elements may be increased by withdrawing the film angularly away from roller 17 and around a portion of the circumference of roller 16.

Figure 3:
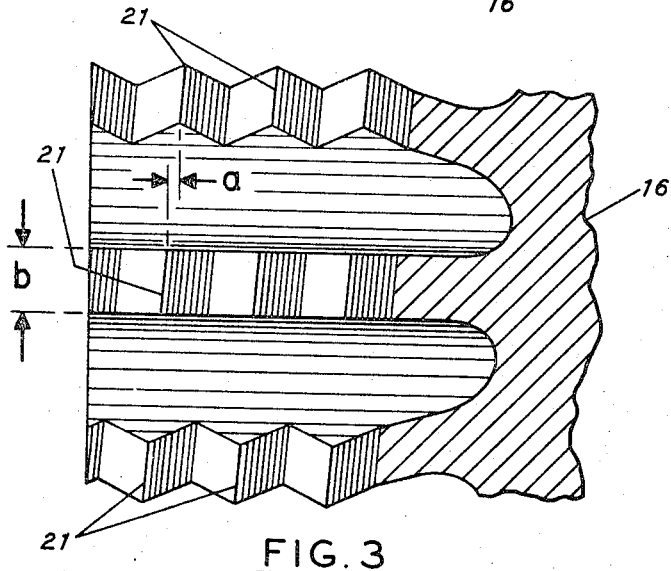
FIG. 3 is a partial, sectional plan view of the rows of cutting elements which form a part of the fibrillation apparatus of FIGS. 1 and 2.

FIG. 3 is an enlarged sectional plan view of three partial rows of prismatic cutting elements 21. The lateral offset distance between successive elements in consecutive rows measured from leading edge to leading edge is represented as $a$. The element length is $b$.

EXAMPLES

The following examples illustrate the process and apparatus of this invention. These examples are not intended to limit the invention described herein.

Example 1

Commercial substantially crystalline polypropylene was extruded as a continuous film at a rate of about 30 ft. per min. The film was trimmed to a width of about 10 in. and then oriented by stretching it over heated rollers at 250—280° F. The ultimate draw ratio was about 7:1. In this way there was produced a film about 7½ in. wide and 1 mil thick. A thin coating of an aqueous emulsion of an antistatic agent was applied to the bottom of the film.

This oriented film was fed through a set of nip rolls and then between a cutting roller and a presser roller. The set of nip rolls was running at a peripheral speed of 210 feet per minute. Both the cutting roller and presser roller were rotating at a peripheral speed of 735 ft. per min. but in opposite directions. These two rollers were coupled by a timing belt drive system and thence to a common drive shaft. The oriented film passed tangentially between the two rollers. The fibrillated film issuing from the cutting roller was then passed through a pair of pull rollers. These pull rollers were turning at a peripheral speed of 212 ft. per min.

The cutting roller was covered by 40 separate, essentially parallel, longitudinal rows of teeth on splines 0.10 in. high and 0.029 in wide. The cutting roller was 8 in. long and 1.97 in. in diameter as measured to the tips of the teeth. The rows of teeth were equally spaced 0.125 in. apart. Each row contained 32 teeth per in. resulting from 4 starts of 8 threads per in. each. The leading edges of the teeth were perpendicular to the roller face; i.e., they had a 90-degree working angle. Each tooth was ground to a 60° razor sharpness at the tip.

The grooved roller was a standard 20 pitch spur gear having a 14½° pressure angle. It was 8 in. long and 4 in. in diameter. It had 80 parallel longitudinal grooves, 0.10 in. wide at the top and about 0.12 in. deep. The presser roller was positioned in relation to the cutting roller in such fashion that the teeth of the cutting roller meshed with and penetrated about 0.010—0.015 in. into the grooves of the presser roller, but the two rollers did not contact each other.

Figure 4:
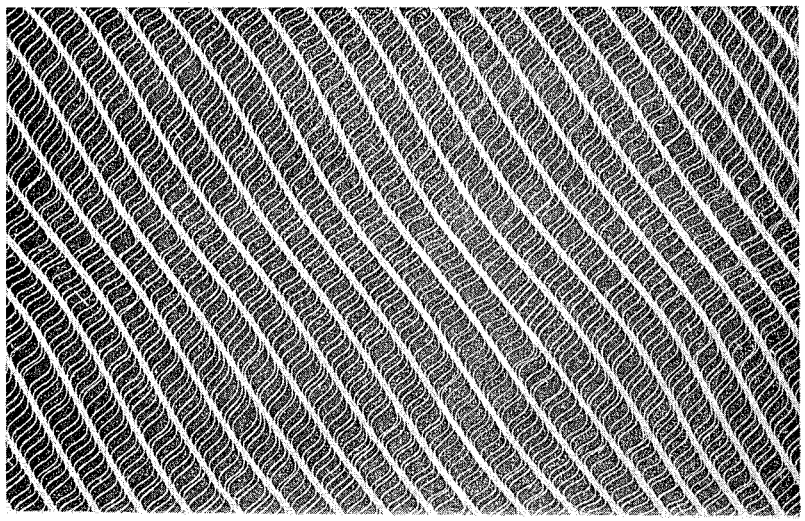
FIGS. 4 and 5 are enlarged photographs of fibrous webs prepared using the fibrillation apparatus of this invention.

A sample of the fibrous web produced by the above example was spread to about 6 times its original width and mounted on a glass plate. This fibrous web has an average of about 215 fibrils per inch of width. Each fibril was 0.003 in. in width, i.e., 17 denier, and was 0.15 in. long. FIG. 4 is a photograph of a portion of this web.

The angle at which the ribs of the fibrous web slope is related to the helix angle of the threads. The smaller this angle, the steeper the angle of the rib. The fibrils which connect these ribs are of uniform width and length. The interfibrillar spaces are substantially the same. The uniformity of the web may be estimated by drawing perpendicular lines across the web width at random intervals and counting the number of fibrils intersecting each line. Of course, the greater the number of fibrils in a fibrillated product the finer is the average denier of each fibril. The variation in the counts is an indication of the uniformity. In the product made by the above-described process, the number of fibrils per inch may be in the range of 50 to 400 or even more. The relative standard deviation rarely exceeds 1 percent.

Example 2

Figure 5:
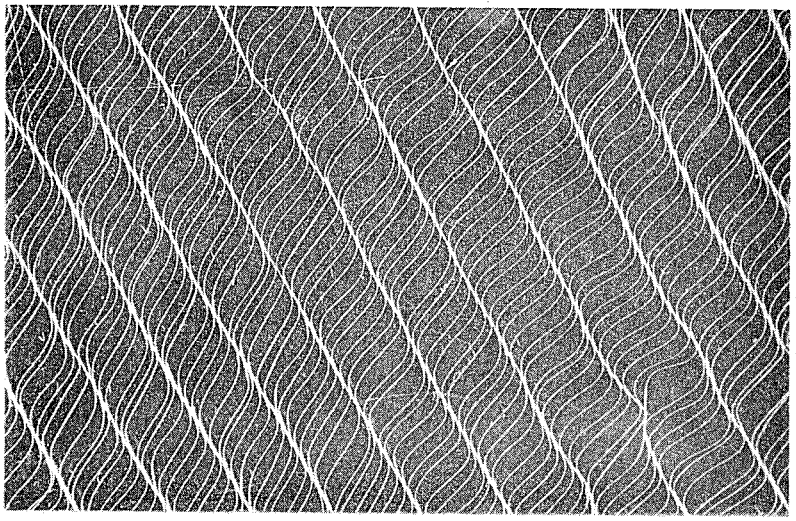

This example was carried out in the same manner as Example 1 except that the film remained in contact with the cutting roller through about 20° of arc after leaving the presser roller. In this way a product was made in which the fibrils were 0.003 in. wide and 0.35 in. long and there were an average of 272 (271—273 range) fibrils per inch of width. A sample of this material was stretched to about 11 times its original width and mounted on a glass plate. FIG. 5 is a photograph of a portion of this material.

Example 3

This example was carried out in essentially the same way as Example 2 except that after orientation and before fibrillation the film was cut longitudinally into strips of predetermined width. After fibrillation these strips were twisted into yarns. The denier of such yarns was determined by the film thickness and the strip width. The hand or the feel of such yarn was softened by increasing fibrillation; that is, fine denier fibrils gave a soft hand to the yarn product. In one case a strip, 0.2 in. wide, was processed in this way and the product on twisting gave a yarn of 1000 denier and of excellent hand.

Example 4

This experiment was carried out in essentially the same way as Example 3 except that the casting speed was at 50 ft. per min. with a corresponding increase in the peripheral speed of the orientation rollers to give an ultimate draw ratio of 7:1. In this case the cutting roller was 3.95 in. in diameter. (The oriented film going into the cutter was 3.5 inches wide.) The teeth of the cutting roller were arranged in 80 longitudinal parallel rolls. The teeth were 0.125 in. apart on ribs that were 0.029 in. wide. Each roll contained 32 teeth per in. resulting from 8 starts of 4 threads per in. The cutting and presser rolls were rotating at peripheral speeds of 855 ft. per minute.

The product produced in this way contained 315 fibrils per in. of width. Each fibril was 0.003 in. wide and 0.50 in. in length.

About 1000 pounds of fibrillated film (consisting of five 0.7-inch wide yarns) was produced in this run. At the end of the run the number of fibrils per inch on each yarn was exactly the same as at the beginning of the run, thereby indicating no measurable dulling or change in the cutting edges. No skips, misses, or other nonuniformities of product were observed at any time in this run.

As will be evident to those skilled in the art, various modifications on this invention can be made or followed, in the light of the foregoing disclosure and discussion, without departing from the spirit or scope of the disclosure or from the scope of the following claims.

I claim:

1. Process for preparing a highly uniform fibrous web from a uniaxially oriented polymer film comprising feeding the film while under tension in the range of about 600 to about 3000 p.s.i. between the respective circumferential surfaces of a first roller and a second roller, the respective circumferential surfaces being parallel and closely adjacent to and spaced apart from each other, the circumferential surface of the first roller having substantially parallel longitudinal elevated rows of substantially equidistant cutting elements formed thereon, successive cutting elements in consecutive rows being offset a lateral distance of about 0.5 to about 50 mils, the circumferential surface of the second roller having formed therein substantially parallel longitudinal grooves communicable with said elevated rows of cutting elements, rotating the first and second rollers substantially synchronously in opposite directions at peripheral speeds about 15 to 20 times greater than the film speed, forcing the rows of cutting elements through the film and into respective communicating grooves so as to cut elongated slits in the film, disengaging said rows from said grooves and withdrawing the slit film from the rollers.

2. The process of claim 1 wherein the polymer is normally solid, substantially crystalline polypropylene and the film is uniaxially oriented to a draw ratio between 6:1 and 10:1 and about 0.5 to about 3 mils thick.

3. The process of claim 1 wherein the peripheral speeds of the first and second rollers are about 2 to 15 times greater than the film speed.

4. The process of claim 1 wherein successive cutting elements in consecutive rows are offset a lateral distance of about 1 to 20 mils.

5. The process of claim 1 wherein the film is fed between the respective circumferential surfaces of the first and second rollers at an angle such that it contacts the circumferential surface of the second roller before the circumferential surface of the first roller.

6. Apparatus for use in preparing fibrous web from an extruded uniaxially oriented moving polymer film by cutting elongated slits in the film comprising a first roller and a second roller positioned with their respective circumferential surfaces parallel and closely adjacent to and spaced apart from each other, means for rotating said first roller and said second roller substantially synchronously and in relatively opposite directions to each other; substantially parallel longitudinal rows of elevated cutting elements formed on the circumferential surface of the first roller, successive cutting elements in consecutive rows being offset a lateral distance of about 0.5 to about 50 mils, longitudinal grooves formed in the circumferential surface of the second roller, selected rows of cutting elements meshing with respective selected longitudinal grooves as the first roller and second roller rotate.

7. Apparatus for use in preparing fibrous web from an extruded uniaxially oriented moving polymer film by cutting elongated slits in the film comprising a first cylindrical roller and a second cylindrical roller positioned with their respective circumferential surfaces parallel and closely adjacent to and spaced apart from each other, means for rotating the first roller and second roller substantially synchronously and in relatively opposite directions to each other, substantially parallel longitudinal splines formed on the circumferential surface of the first roller, rows of substantially equidistant prismatic cutting elements formed on the tops of said splines, the successive cutting elements on consecutive splines being offset a lateral distance of about 0.5 to about 50 mils from each other, substantially parallel longitudinal grooves formed in the circumferential surface of the second roller, selected splines being positioned complementary to and in meshing relationships to respective selected longitudinal grooves, said splines penetrating radially into the respective selected grooves as the first roller and second roller rotate.

8. The apparatus of claim 7 wherein the leading face of the spline is perpendicular to the forward motion of the spline.

9. The apparatus of claim 8 wherein the apex angles of the cutting elements are 10°—70° and the cutting elements are 0.1 to 100 mils long.

10. The apparatus of claim 8 wherein the apex angles of the cutting elements are 60° and the cutting elements are about 1 to 30 mils long.

11. Apparatus for use in preparing fibrous web from an extruded uniaxially oriented moving polymer film by cutting elongated slits in said film comprising a cylindrical first roller and a cylindrical second roller positioned with their respective circumferential surfaces parallel and closely adjacent to and spaced apart from each other, means for feeding said film between the first roller and second roller at an angle such that the film contacts the first roller, means for rotating the first roller and second roller in relatively opposite directions to each other and substantially synchronously at peripheral speeds about 1.5 to 20 times greater than the film speed, substantially parallel, longitudinal grooves formed in the circumferential surface of the second roller, substantially parallel splines about 1 to 30 mils wide at the spline top extending radially from the circumferential surface of the first roller, the leading face of the spline being perpendicular to the projected forward motion of the spline, rows of substantially equidistant prismatic teeth having apex angles of about 60° formed on the tops of said splines, successive teeth on consecutive splines being offset a lateral distance of about 0.5 to 50 mils, selected splines being positioned complementary to respective selected grooves of the second roller, said selected splines meshing with said respective selected grooves as the first roller and second roller rotate, means for withdrawing the film from between said first roller and said second roller, and means for keeping the film under about 600 to about 3000 p.s.i. tension while said film is in contact with the circumferential surfaces of the first roller and second roller.

PO-1050
(5/69)

UNITED STATES PATENT OFFICE
CERTIFICATE OF CORRECTION

Patent No. 3,550,826      Dated December 29, 1970

Inventor(s) John M. Salmela

It is certified that error appears in the above-identified patent and that said Letters Patent are hereby corrected as shown below:

Claim 1, col. 6, line 37, "15 to 20" should read --1.5 to 20--

Claim 11, col. 8, line 6, "film contacts the first roller, me should read --film contacts the circumferential surface of the second roller before it contacts the first roller, means--.

Signed and sealed this 10th day of August 1971.

(SEAL)
Attest:

EDWARD M. FLETCHER, JR.      WILLIAM E. SCHUYLER, JR.
Attesting Officer      Commissioner of Patents